United States Patent
Gupta et al.

(10) Patent No.: US 10,694,557 B2
(45) Date of Patent: Jun. 23, 2020

(54) METHODS AND SYSTEMS FOR SECURE ONBOARDING OF DEVICES OVER A WIRELESS NETWORK

(71) Applicant: RELIANCE JIO INFOCOMM LIMITED, Mumbai-Maharashtra (IN)

(72) Inventors: Ajay Kumar Gupta, Pune-Maharashtra (IN); Vishal Vasant Oak, Bangalore-Karnataka (IN); Mahesh Nayaka Mysore Annaiah, Bangalore-Karnataka (IN); Tareq Amin, Mission Viejo, CA (US)

(73) Assignee: Reliance Jio Infocomm Limited, Mumbai (IN)

( * ) Notice: Subject to any disclaimer, the term of this patent is extended or adjusted under 35 U.S.C. 154(b) by 0 days.

(21) Appl. No.: 16/322,235

(22) PCT Filed: Aug. 9, 2017

(86) PCT No.: PCT/IB2017/054855
§ 371 (c)(1),
(2) Date: Jan. 31, 2019

(87) PCT Pub. No.: WO2018/029608
PCT Pub. Date: Feb. 15, 2018

(65) Prior Publication Data
US 2019/0200405 A1    Jun. 27, 2019

(30) Foreign Application Priority Data
Aug. 11, 2016  (IN) .............................. 201621027538

(51) Int. Cl.
*H04W 76/11* (2018.01)
*H04W 92/10* (2009.01)
(Continued)

(52) U.S. Cl.
CPC ......... *H04W 76/11* (2018.02); *H04L 12/4625* (2013.01); *H04L 41/0803* (2013.01);
(Continued)

(58) Field of Classification Search
CPC ..... H04W 76/11; H04W 80/02; H04W 92/10; H04W 4/70; H04W 76/10; H04W 12/04;
(Continued)

(56) References Cited

U.S. PATENT DOCUMENTS 9,781,259 B1 * 10/2017 Kodaypak ............. H04L 67/303
2015/0071052 A1    3/2015 Hershberg et al.
(Continued)

OTHER PUBLICATIONS

PCT International Search Report, International Application No. PCT/IB2017/054855, dated Nov. 17, 2017, pp. 1-3.

*Primary Examiner* — Jung Liu
(74) *Attorney, Agent, or Firm* — Hunton Andrews Kurth LLP

(57) ABSTRACT

Embodiments of the present invention relate to systems and methods for automatically connecting an IoT device [130] to an access point [120] via a wireless network [140], comprising: receiving a configuration setting request at an onboarding server [110] from the access point [120] pursuant to receiving a broadcasting probe request from the IoT device [130] at the access point [120], transmitting one of a configuration setting and a default setting to the access point [120] based on a status of the IoT device [130] wherein status includes one of an on-board and an off-board, establishing one of a permanent connection using the configuration setting and a temporary connection using the default setting between the access point [120] and the IoT device [130] via the wireless network [140]; and switching the status of the IoT device [130] to the on-board in an event the temporary connection is established.

26 Claims, 8 Drawing Sheets

(51) Int. Cl.
  *H04W 4/70*  (2018.01)
  *H04W 76/00* (2018.01)
  *H04L 12/24* (2006.01)
  *H04L 12/46* (2006.01)
  *H04W 12/04* (2009.01)
  *H04W 12/00* (2009.01)
  *H04W 80/02* (2009.01)
  *H04W 84/12* (2009.01)
  *H04W 12/08* (2009.01)

(52) U.S. Cl.
  CPC ........... *H04L 41/0806* (2013.01); *H04W 4/70* (2018.02); *H04W 12/0023* (2019.01); *H04W 12/04* (2013.01); *H04W 76/00* (2013.01); *H04W 80/02* (2013.01); *H04W 92/10* (2013.01); *H04W 12/00512* (2019.01); *H04W 12/08* (2013.01); *H04W 84/12* (2013.01)

(58) Field of Classification Search
  CPC ............. H04W 12/0023; H04W 76/00; H04W 12/00512; H04W 12/08; H04W 84/12; H04W 12/0401; H04W 12/0609; H04W 12/06; H04W 4/80; H04L 41/0806; H04L 12/4625; H04L 41/0803; H04L 63/0435; H04L 63/0876; H04L 63/0823; H04L 63/06; H04L 9/006; H04L 9/3263; H04L 9/3247; H04L 9/3242; H04L 9/30; H04L 2209/80; H04L 9/12; H04L 9/0861
  See application file for complete search history.

(56) References Cited

U.S. PATENT DOCUMENTS

| | | | |
|---|---|---|---|
| 2015/0256587 A1* | 9/2015 | Walker | G06F 16/639 |
| | | | 709/203 |
| 2015/0317467 A1 | 11/2015 | Rattner et al. | |
| 2015/0334769 A1* | 11/2015 | Kim | H04L 5/0035 |
| | | | 370/329 |
| 2017/0093861 A1* | 3/2017 | Kesavan | H04W 4/70 |
| 2017/0230832 A1* | 8/2017 | Ophir | H04W 4/70 |
| 2017/0242674 A1* | 8/2017 | Hussein | H04L 67/34 |
| 2017/0244600 A1* | 8/2017 | Hussein | H04L 41/0806 |
| 2017/0347264 A1* | 11/2017 | Holland | H04W 12/0401 |
| 2019/0335428 A1* | 10/2019 | Bendlin | H04W 72/042 |

* cited by examiner

METHODS AND SYSTEMS FOR SECURE ONBOARDING OF DEVICES OVER A WIRELESS NETWORK

TECHNICAL FIELD

Embodiments of the present invention generally relate to wireless communication. In particular, embodiments of the present invention relate to secure onboarding of Wi-Fi enabled internet of thing (IoT) devices to a wireless network served by one or more wireless access points.

BACKGROUND

In recent years, the Wi-Fi technology based on IEEE 802.11 standards has seen tremendous growth and commercialization. Almost all available user equipment, with cellular capability support, have Wi-Fi capability to connect with Wi-Fi networks operating in any of the unlicensed frequency bands, 2.4 GHz or 5 GHz.

With the "Internet of things" (referred hereafter as "IoT") concept getting prevalent these days, devices used in daytoday activities such as coffee makers, electric switches, washing machines, headphones, lamps etc. are also being increasingly looked upon as potential IoT devices. An IoT device is generally provisioned with an internet protocol (referred hereafter as "IP") address to provide it with the capability of transferring data and receive control signals over the wireless network.

In general, a Wi-Fi network comprises of a plurality of wireless access points that provide wireless services in an area covered by the plurality of wireless access points. Each of the wireless access points is compliant to IEEE 802.11 standard and operates in 2.4 GHz and 5 GHz unlicensed spectrum. Also, the plurality of wireless access points shares a common network identifier and are connected to a centralized server via wireless interface/s. The centralized server further manages onboarding functions related to the IoT devices. Moreover, the IoT devices which are already on boarded or seeking onboarding on the Wi-Fi network are served by the plurality of wireless access points. Currently, in order to connect the IoT devices with the Wi-Fi network, a user interface of a user equipment is utilized to perform various onboarding functions related to the IoT devices. This is due to the reason as most of the IoT devices lack dedicated and comprehensive user interface to provision Wi-Fi configuration setting thereby, making it difficult for users of these IoT devices to board the devices on to their Wi-Fi network.

In the absence of dedicated user interface of the IoT devices, for configuring Wi-Fi access details, many of the IoT devices rely on WPS (Wi-Fi Protected Setup) support on the user equipment and the wireless access points to get connected to the Wi-Fi network. However, WPS requires manual intervention to connect or re-connect with the IoT devices to the Wi-Fi network, thereby making it a non-seamless and non-scalable onboarding technology. Moreover, the WPS is difficult to troubleshoot and has known security flaws.

Other existing approach that is commonly available today is based on configuring the IoT devices to function as a Wi-Fi hotspot with predefined configuration setting available with the IoT devices, after which the user equipment gets connected to the IoT devices in order to push the Wi-Fi configuration setting into the IoT device to onboard it on the Wi-Fi network. However, this approach requires a moderate level of technology expertise and involves multiple steps making it a time consuming and non-scalable approach.

Another alternative approach relies on communicating and onboarding an IoT device with assistance from another IoT device that is already on board on the Wi-Fi network over a communication interface compatible with both of the IoT devices. However, the approach requires the support of additional communication interface on IoT devices so that the IoT device seeking onboarding to the server communicates with another IoT device which is already on board on the Wi-Fi network.

Therefore, in view of the above shortcomings in the existing approaches, there is a need in the art that ensures easy and smooth onboarding of the IoT devices on the Wi-Fi network, considering the lack of dedicated user interface with the IoT devices for Wi-Fi configuration provisioning.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for automatically connecting at least one IoT device to at least one access point via a wireless network, the method being performed by an onboarding server, the method comprising: receiving a configuration setting request from at least one access point, wherein the at least one access point transmits the configuration setting request pursuant to receiving a broadcasting probe request from the at least one IoT device, and the configuration setting request includes an identifier corresponding to the at least one IoT device; determining a status of the at least one IoT device based on an analysis of the identifier, wherein the status of the at least one IoT device includes one of an on-board and an off-board; transmitting one of a configuration setting and a default setting to the at least one access point based on the status of the at least one IoT device, wherein the configuration setting is transmitted to the at least one access point in an event the status of the at least one IoT device is the on-board, and the default setting is transmitted to the at least one access point in an event the status of the at least one IoT device is the off-board; establishing one of a permanent connection using the configuration setting and a temporary connection using the default setting, between the at least one access point and the at least one IoT device via the wireless network; and switching the status of the at least one IoT device to the on-board in an event the temporary connection is established, wherein the switching comprising steps of: receiving the identifier from the at least one IoT device via the temporary connection, generating and transmitting the configuration setting corresponding to the at least one IoT device based on a positive matching of the identifier with a preconfigured set of identifiers, receiving an indication from the at least one IoT device in an event the at least one IoT device stores the configuration setting, and updating the status of the at least one IoT device to the on-board pursuant to receiving the indication.

Embodiments of the present invention may relate to a method for automatically connecting at least one IoT device over at least one wireless network, the method being performed by the at least one IoT device, the method comprising: transmitting a broadcasting probe request to at least one access point, wherein the broadcasting probe request includes an identifier corresponding to the at least one IoT device, the identifier is transmitted to an onboarding server from the at least one access point for determining a status of the at least one IoT device, and the status includes one of an onboard and an off-board; establishing one of a permanent connection using a configuration setting and a temporary connection using a default setting, to the at least one access point via the wireless network, wherein the permanent connection using the configuration setting is established in an event the status of the at least one IoT device is the on-board, and the temporary connection using a default setting is established in an event the status of the at least one IoT device is the off-board; and establishing the permanent connection in an event the temporary connection is established, wherein the establishing comprising steps of: transmitting the identifier to the onboarding server via the temporary connection, receiving the configuration setting corresponding to the at least one IoT device from the onboarding server, storing the configuration setting and providing an indication to the onboarding server, and establishing the permanent connection using the stored configuration setting with the at least one access point via the wireless network.

Embodiments of the present invention may relate to a method for automatically connecting at least one IoT device to at least one access point via a wireless network, the method being performed by at least one access point, the method comprising: transmitting a configuration setting request to an onboarding server, wherein the at least one access point transmits the configuration setting request pursuant to receiving a broadcasting probe request from the at least one IoT device, and the configuration setting request includes an identifier corresponding to the at least one IoT device; receiving one of a configuration setting and a default setting from the onboarding server based on a status of the at least one IoT device, wherein the configuration setting is received from the onboarding server in an event the status of the at least one IoT device is an on-board, and the default setting is received from the onboarding server in an event the status of the at least one IoT device is an off-board; allowing the at least one IoT device and the onboarding server to establish one of a permanent connection using the configuration setting and a temporary connection using the default setting via the wireless network; and enabling the onboarding server to switch the status of the at least one IoT device to the on-board in an event the temporary connection is established, wherein the enabling the onboarding server to switch comprising steps of: allowing the onboarding server to receive the identifier from the at least one IoT device to via the temporary connection, allowing the onboarding server to transmit the configuration setting to the at least one IoT device based on a positive matching of the identifier with a preconfigured set of identifiers, allowing the onboarding server to receive an indication from the at least one IoT device in an event the at least one IoT device stores the configuration setting, and allowing the onboarding server to switch the status of the at least one IoT device to the on-board pursuant to receiving the indication.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1:
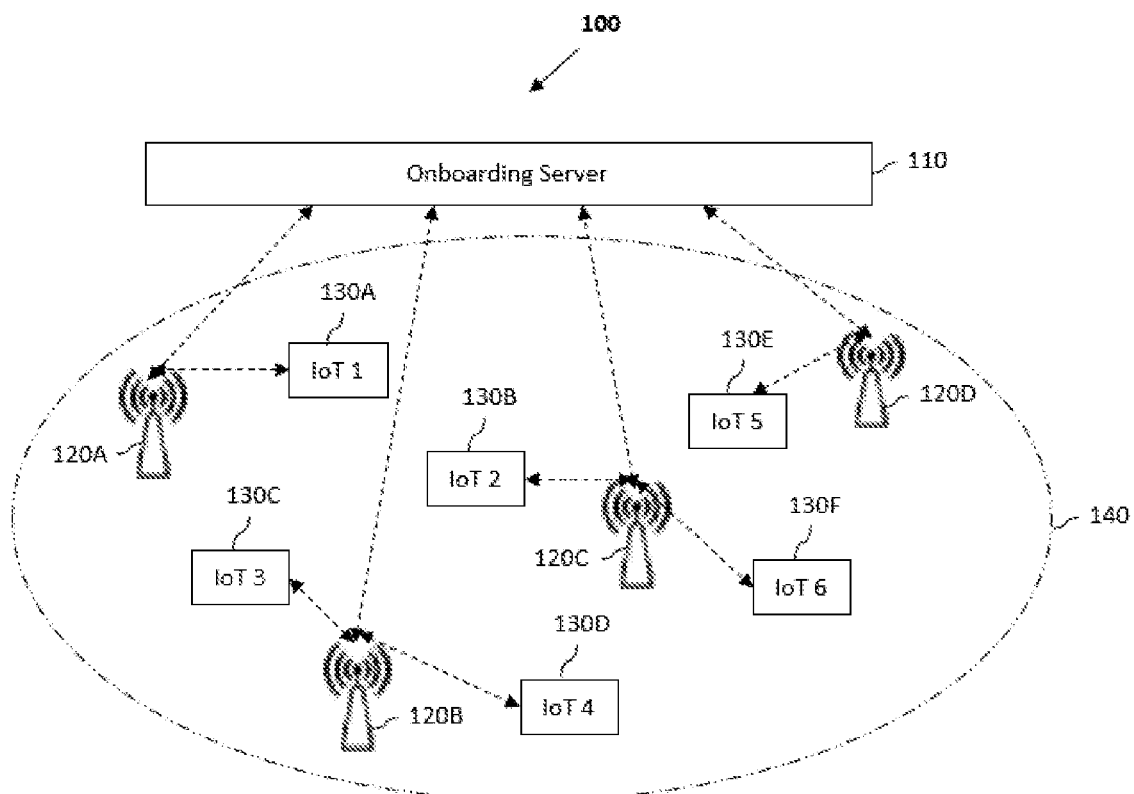
FIG. 1 illustrates an overall system [100] for automatically connecting an IoT device to an access point via a wireless network, in accordance with an embodiment of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses systems and methods for an onboarding server that automatically connects at least one IoT device to at least one access point via a wireless network. The present invention facilitates systems and methods for the at least one IoT device that automatically connects to the at least one access point via the wireless network. The present invention further facilitates systems and methods for the at least one access point that automatically connects the at least one IoT device to the at least one access point via the wireless network.

As used herein, the at least one IoT device is capable of receiving and/or transmitting one or parameters, performing function/s, communicating with other IoT devices as well as non-IoT devices and transmitting data to the devices. The at least one IoT device may be one of, but not limited to, a thermostat, an electric switch, a washing machine, a computing device, a coffee maker, a refrigerator, a headphone, a lamp, a room sensor, a microwave, a fan, a light and any such device that is obvious to a person skilled in the art.

As used herein, the at least one access point serves a wireless network to the at least one IoT device, wherein the at least one access point serves the at least one IoT device using a connection established between said at least one IoT device and said at least one access point via the wireless network.

As used herein, the wireless network is capable of providing one of a long-range and short-range wireless communication between the at least one IoT device, the at least one access point and the onboarding server. Further, the wireless network is operable at a variable wireless frequency band such as 2.4 GHz and 5 GHz.

As illustrated in FIG. 1, the present invention illustrates an overall system [100] for automatically connecting an IoT device to an access point via a wireless network, in accordance with an embodiment of the present disclosure, the system [100] comprising: an onboarding server [110], at least one access point [120A, 1208, 120C, 120D] providing a wireless network [140], and at least one IoT device [130A, 130B, 130C, 130D, 130E, 130F].

The at least one access point [120A, 120B, 120C, 120D] may serve the wireless network [140] to the at least one IoT device [130A, 130B, 130C, 130D, 130E, 130F]. Further, the at least one IoT device [130A, 130B, 130C, 130D, 130E, 130F] may be connect and communicate with the at least one access point [120A, 120B, 120C, 120D] via the wireless network [140].

The onboarding server [110] may be capable of communicating with the at least one access point [120A, 120B, 120C, 120D] and the at least one IoT device [130A, 130B, 130C, 130D, 130E, 130F] over the wireless network [140]. As depicted in an exemplary Table 1, the onboarding server [110] may maintain information such as a unique identifier, a status, default setting, and configuration setting corresponding to each of the IoT device [130A, 130B, 130C, 130D, 130E, 130F].

TABLE 1

| IoT Device | IoT Identifier | Default Setting | Configuration Setting | Status |
|---|---|---|---|---|
| 130A | IoT 1 | D-IoT1 | C-IoT1 | On-board |
| 130B | IoT 2 | D-IoT2 | NA | Off-board |
| 130C | IoT 3 | D-IoT3 | NA | Off-board |
| 130D | IoT 4 | D-IoT4 | C-IoT4 | On-board |
| 130E | IoT 5 | D-IoT5 | NA | Registered |
| 130F | NA | NA | NA | Un-registered |

With respect to the exemplary Table 1, the IoT devices [130A, 130D] may have "IoT 1" & "IoT 4" as the unique identifiers, respectively and may have the status as "On-board" i.e. the IoT device [130A, 130D] have already on-boarded on the onboarding server [110], thereby the onboarding server [110] may have both the default setting [D-IoT1, D-IoT4] and the configuration setting [C-IoT1, C-IoT 4] for the IoT devices [130A, 130D]. Similarly, the IoT devices [130B, 130C] may have "IoT 2" & "IoT 3" as the unique identifiers, respectively and may have the status as "Off-board" i.e. the IoT devices [130B, 130C] may have not yet on-boarded on the onboarding server [110], thereby the onboarding server [110] may only have the default setting [D-IoT2, D-IoT3] for the IoT devices [130B, 130C]. The IoT device [130E] may have "IoT 5" as the unique identifier and may have the status as "registered" i.e. the IoT device [130E] have not yet on-boarded but have registered with the onboarding server [110], thereby the onboarding server [110] may only have the default setting [D-IoT5] for the IoT device [130E]. Lastly, the IoT device [130F] may have the status as "unregistered" (i.e. not registered) with the onboarding server [100], thereby the onboarding server [110] may not be aware of the unique identifier, the [110], default setting and the configuration setting for the IoT device [130F]. As seen in the table 1, the onboarding server [110] may have a list of preconfigured IoT identifiers such as IoT 1, IoT 2, IoT 3, IoT 4 and IoT 5. In the detailed description provided herein below, the IoT device [130] may relate to one or more IoT device 130A, 130B, 130C, 130D, 130E, and 130F. Further, the access point [120] may relate to one or more access point 120A, 120B, 120C, and 120D.

As used herein, the default setting of the IoT device [130] includes, but not limited to, a service set identifier of the IoT device [130], a password/pass-phrase and a combination thereof. Further, the default setting for each of the IoT device [130] may be generated/created by one of a manufacturer of the IoT device [130], a third-party vendor and a user of the IoT device [130] through/using one of an online web portal and an application installed on a computing device. Subsequently, the default setting generated for each of the IoT device [130] may be embedded in a memory of the respective IoT device [130] at the time of manufacturing the IoT device [130]. Further, for identification and tally of the IoT devices with respective default setting, each of the IoT devices are configured with identifiers and such identifier details may along with the default setting may be stored at the onboarding server [110] using one of the online web portal and the application installed on the computing device.

As used herein, the configuration setting of the IoT device [130] includes, includes, but not limited to, a service set identifier of the IoT device [130], a password/pass-phrase and a combination thereof. Further, the configuration setting for each of the IoT device [130] may be generated/created by the onboarding server [110]. Moreover, the configuration setting of the IoT device [130] may be stored in the memory of the IoT device [130] after the onboarding server [110] generates/creates the configuration setting.

As used herein, the "unique identifier" may refer to a numeric or alphanumeric string that is used for identifying the IoT device [130]. The unique identifier may include, but not limited to, a media access control (MAC) address, a vendor identifier and any such identifier obvious to a person skilled in the art.

As used herein, the word "on-board" may refer to a status of the IoT device [130] maintained at the onboarding server [110] and may represent that the IoT device [130] has a prior communication with the onboarding server [110]. The "on-board" status of the IoT device [130] may further represents that the onboarding server [110] has already generated the configuration setting for the IoT device [130] based on the prior communication of the IoT device [130] with the onboarding server [110].

As used herein, the "off-board" of the IoT device [130] may refer to a status of the IoT device [130] maintained at the onboarding server [110] and may represent that the IoT device [130] has never established any prior communication with the onboarding server [110] and may be trying communicate with the onboarding server [110] for a first time. This first communication between the IoT device [130] and the onboarding server [110] may lead to generation of the configuration setting for the IoT device [130] by the onboarding server [110]. Further, when the status of the IoT device [130] is "off-board", the onboarding server [110] may be aware of the default setting of the IoT device [130] and may not have yet generated the configuration setting for the IoT device [130].

As used herein, the "registered" of the IoT device [130] may refer to a status of the IoT device [130] maintained at the onboarding server [110] where the IoT device [130] may never have the prior communication with the onboarding server [110] and may represent that the IoT device [130] has been manufactured with the default setting. Further, when the onboarding server [110] may be made aware of the default setting through one of the manufacturer of the IoT device [130], the third-party vendor and the user of the IoT device [130] using one of the online web portal and the application installed on the computing device, then the onboarding server [110] may mark the status of the IoT device [130] as "registered". In other words, the IoT device [130] may be registered at the onboarding server [110 by one of the manufacturer of the IoT device [130], the third-party vendor and the user of the IoT device [130] using one of the online web portal and the application installed on the computing device.

As used herein, the "unregistered" status of the IoT device [130] may refer to a status of the IoT device [130] maintained at the onboarding server [110] where the onboarding server [110] may not be aware of the unique identifier, the default setting and the configuration setting for the IoT device [130]. In other words, none of the manufacturer of the IoT device [130], the third-party vendor and the user of the IoT device [130] may not have registered the IoT device [130] with the onboarding server [110]. Therefore, the "on-board" IoT device [130] may include one or more "registered" IoT device [130]. Whereas, the "off-board" IoT device [130] may include one or more "registered" and "unregistered" IoT device.

The detailed specifics of the overall system [100] are explained hereinafter. Following the exemplary Table 1, when the IoT device [130] is turned on, the IoT device [130] may transmit a broadcast/discovery probe request to the access point [120] in the form of transmitting one or more packets in the air which may be captured by the access point [120]. The access point [120], in turn, may transmit a configuration setting request to the onboarding server [110]. The broadcast/discovery probe request from the IoT device [130] to the access point [120] and the configuration setting request from the access point [120] to the onboarding server [110] may include the unique identifier of the IoT device [130]. For an instance, the IoT devices [130A, 130B] broadcast the broadcast/discovery probe request including the unique identifiers "IoT 1" and "IoT 2" in the air and the access point [120] may receive the broadcast/discovery probe request from the IoT devices [130A, 130B] with the unique identifiers "IoT 1" and "IoT 2" respectively which in turn, may transmit the configuration setting request including the unique identifiers "IoT 1" and "IoT 2" to the onboarding server [110].

On receiving the configuration setting request from the access point [120], the onboarding server [110] may then determine a status of the IoT device [130] based on the unique identifier of the IoT device [130]. Following the above example, the onboarding server [110] may check the status of the IoT devices [130A, 130B] in the Table 1 maintained in a database, based on the unique identifier "IoT 1" and "IoT 2" respectively of the IoT devices [130A, 130B], the onboarding server [110] may determine that the IoT devices [130A, 130B] has the status as "On-board" and "Off-board" respectively.

Based on the status of the IoT device [130], the onboarding server [110] may transmit one of the configuration setting and the default setting of the IoT device [130] to the access point [120]. The configuration setting may be transmitted to the access point [120] if the IoT device [130] has the status as "On-board" and the default setting may be transmitted to the access point [120] if the IoT device [130] has the status as "Off-board". Following the same example from the Table 1, the onboarding server [110] may transmit the configuration setting [C-IoT1] of the IoT device [130A] to the access point [120] as the IoT device [130A] has the status as "On-board". Similarly, the onboarding server [110] may transmit the default setting [D-IoT2] of the IoT device [130B] to the access point [120] as the IoT device [130B] has the status as "Off-board".

Once the access point [120] receives one of the configuration setting and the default setting from the onboarding server [110], the access point [120] may allow the IoT device [130] to establish a temporary connection with the access point [120] via the wireless network [140] using the default setting; otherwise, a permanent connection may be established between the access point [120] and the IoT device [130] via the wireless network [140] using the configuration setting. For an example, the permanent connection may be established between the IoT device [130A] and the access point [120] via the wireless network [140] using the configuration setting [C-IoT1] as the IoT device [130A] has the status as "On-board". Similarly, the temporary connection may be established between the IoT device [130B] and the access point [120] via the wireless network [140] using the default setting [D-IoT2] as the IoT device [130B] has the status as "Off-board".

In a scenario where the temporary connection is established between the IoT device [130] and the access point [120] via the wireless network [140] using the default setting, the IoT device [130] may now communicate via the wireless network [140] with the onboarding server [110]. In such scenario, the IoT device [130] may push the unique identifier to the onboarding server [110] via the wireless network [140] wherein the unique identifier corresponds to the IoT device [130]. For example, when the temporary connection is established between the IoT device [130B] and the access point [120] via the wireless network [140], the IoT device [130B] may push the unique identifier "IoT 2" to the onboarding server [110] via the wireless network [140].

On receiving the unique identifier from the IoT device [130], the onboarding server [110] may determine if the IoT device [130] is a registered or an unregistered one, with the onboarding server [110]. In an event, there is a positive matching of the unique identifier corresponding to the IoT device [130] with the list of preconfigured set of identifiers [e.g. IoT 1, IoT 2, IoT 3, IoT 4, IoT 5] i.e. the IoT device [130] is registered with the onboarding server [110], then the onboarding server [110] may generate the configuration setting for the IoT device [130]; otherwise the onboarding server [110] may transmit or indicate an error to the IoT device [130] when there is no or negative matching of the unique identifier corresponding to the IoT device [130] with the list of preconfigured set of identifiers. For example, the onboarding server [110] may check in the Table 1 to determine the status of the IoT device [130B]. In other words, the onboarding server [110] may check in the Table 1 (having list of all the unique identifiers of the IoT devices [130]) if any of the IoT device [130] with the unique identifier "IoT 2" is registered or unregistered with the onboarding server [110]. In this case, the onboarding server [110] determines the positive matching for the unique identifier "IoT 2" i.e. the unique identifier "IoT 2" with the status "Off-board" exists in the Table 1 which indicates that the IoT device [130B] is already registered with the onboarding server [110]. Based on this determination that the IoT device [130B] is registered, the onboarding server [110] may generate the configuration setting for the IoT device [130B] based on one or more user inputs of required parameters such as Wi-Fi SSID, password/passphrase etc.

After generating the configuration setting for the IoT device [130], the onboarding server [110] may transmit the configuration setting to the IoT device [130] via the wireless network [140] wherein the configuration setting is generated for the IoT device [130]. When the IoT device [130] receives the configuration setting, the IoT device [130] may store the configuration setting in a memory of the IoT device [130] and may further transmit an indication to the onboarding server [110] for storing the configuration setting in the memory of the IoT device [130]. For instance, the onboarding server [110] may transmit the configuration setting of the IoT device [130B] to the IoT device [130B] which in turn stores the configuration setting in the memory of the IoT device [130B]. The indication transmitted by the IoT device [130] to the onboarding server [110] may be an acknowledgement, a hint signal and any such indication obvious to a person skilled in the art.

Once the onboarding server [110] receives indication from the IoT device [130] for storing the configuration setting, the onboarding server [110] may change/switch the status of the IoT device [130] from "Off-board" to "On-board". For instance, the onboarding server [110] may change/switch the status of the IoT device [130B] from "Off-board" to "On-board" in the exemplary Table 1.

After storing the configuration setting, the IoT device [130] may now again transmit the broadcast/discovery probe request to the access point [120] which in turn, may transmit the configuration setting request to the onboarding server [110]. The broadcast/discovery probe request from the IoT device [130] to the access point [120] and the configuration setting request from the access point [120] to the onboarding server [110] may include the unique identifier of the IoT device [130]. Then, the onboarding server [110] may determine the status of the IoT device [130] based on the unique identifier of the IoT device [130] resulting in transmitting either the configuration setting to the access point [120] if the IoT device [130] has the status as "On-board" or the default setting if the IoT device [130] has the status as "Off-board". Following the same example where the onboarding server [110] has changed/switched the status of the IoT device [130B] from "Off-board" to "On-board" and has transmitted the configuration setting to the IoT device [130B]. In this case, the IoT device [130B] transmits transmit the broadcast/discovery probe request to the access point [120] which in turn, may transmit the configuration setting request to the onboarding server [110]. The broadcast/discovery probe request from the IoT device [130B] to the access point [120] and the configuration setting request from the access point [120] to the onboarding server [110] may include the unique identifier "IoT 2" of the IoT device [130B]. Then, the onboarding server [110] may determine the status of the IoT device [130B] based on the unique identifier "IoT 2" of the IoT device [130B] resulting in transmitting the configuration setting to the access point [120] as the IoT device [130B] has the status as "On-board. Then, the access point [120] uses the configuration setting of the IoT device [130B] and allows the IoT device [130B] to establish the permanent connection with access point [120] via the wireless network [140].

Figure 2:
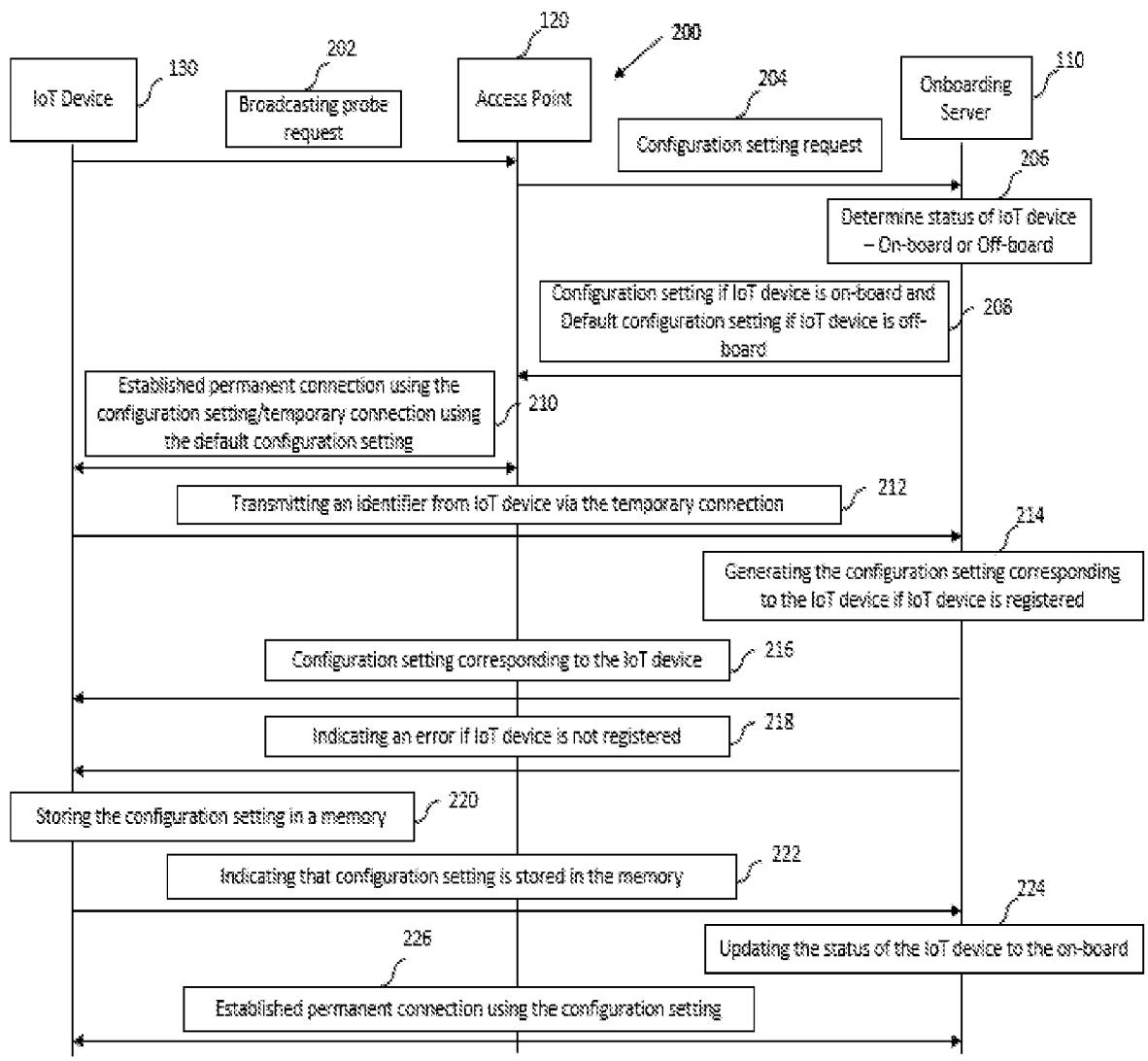
FIG. 2 illustrates an exemplary signaling flow diagram [200] for automatically connecting the IoT device to the access point via the wireless network, in accordance with an embodiment of the present disclosure.

As illustrated in FIG. 2, the present invention illustrates an exemplary signaling flow diagram [200] for automatically connecting the IoT device [130] to the access point [120] via the wireless network [140], in accordance with an embodiment of the present disclosure.

At step 202, when the IoT device [130] is turned on, the IoT device [130] may transmit the broadcast/discovery probe request to the access point [120] in the form of transmitting one or more packets in the air which may be captured by the access point [120] wherein the broadcast/discovery probe request includes the unique identifier of the IoT device [130]. For an instance, the IoT devices [130A, 130B] transmit the broadcast/discovery probe request in the air including the unique identifiers "IoT 1" and "IoT 2".

At step 204, the access point [120] may transmit the configuration setting request to the onboarding server [110] wherein the configuration setting request may include the unique identifier of the IoT device [130]. For instance, the access point [120] may receive the broadcast/discovery probe request from the IoT devices [130A, 130B] with the unique identifiers "IoT 1" and "IoT 2" respectively and may transmit the configuration setting request including the unique identifiers "IoT 1" and "IoT 2" to the onboarding server [110].

At step 206, the onboarding server [110] may then determine the status of the IoT device [130] based on the unique identifier of the IoT device [130]. Following the above example, the onboarding server [110] may check the status of the IoT devices [130A, 130B] in the Table 1 maintained in the database, based on the unique identifier "IoT 1" and "IoT 2" respectively of the IoT devices [130A, 130B] the onboarding server [110] may determine that the IoT devices [130A, 130B] has the status as "On-board" and "Off-board" respectively.

At step 208, the onboarding server [110] may transmit one of the configuration setting and the default setting of the IoT device [130] to the access point [120]. The configuration setting may be transmitted to the access point [120] if the IoT device [130] has the status as "On-board" and the default setting may be transmitted to the access point [120] if the IoT device [130] has the status as "Off-board". Following the same example from the Table 1, the onboarding server [110] may transmit the configuration setting [C-IoT1] of the IoT device [130A] to the access point [120] as the IoT device [130A] has the status as "On-board". Similarly, the onboarding server [110] may transmit the default setting [D-IoT2] of the IoT device [130B] to the access point [120] as the IoT device [130B] has the status as "Off-board".

At step 210, once the access point [120] receives one of the configuration setting and the default setting from the onboarding server [110], the access point [120] may allow the IoT device [130] to establish the temporary connection with the access point [120] via the wireless network [140] using the default setting; otherwise, the permanent connection may be established between the access point [120] and the IoT device [130] via the wireless network [140] using the configuration setting. For an example, the permanent connection may be established between the IoT device [130A] and the access point [120] via the wireless network [140] using the configuration setting [C-IoT1] as the IoT device [130A] has the status as "On-board". Similarly, the temporary connection may be established between the IoT device [130B] and the access point [120] via the wireless network [140] using the default setting [D-IoT2] as the IoT device [130B] has the status as "Off-board".

At step 212, in a scenario where the temporary connection is established between the IoT device [130] and the access point [120] via the wireless network [140] using the default setting, the IoT device [130] may now communicate via the wireless network [140] with the onboarding server [110]. In such scenario, the IoT device [130] may push the unique identifier to the onboarding server [110] via the wireless network [140] wherein the unique identifier corresponds to the IoT device [130]. For example, when the temporary connection is established between the IoT device [130B] and the access point [120] via the wireless network [140], the IoT device [130B] may push the unique identifier "IoT 2" to the onboarding server [110] via the wireless network [140].

At step 214, on receiving the unique identifier from the IoT device [130], the onboarding server [110] may determine if the IoT device [130] is registered or unregistered with the onboarding server [110]. In an event, there is a positive matching of the unique identifier corresponding to the IoT device [130] with the list of preconfigured set of identifiers [e.g. IoT 1, IoT 2, IoT 3, IoT 4, IoT 5] i.e. the IoT device [130] is registered with the onboarding server [110], the onboarding server [110] may generate the configuration setting for the IoT device [130]. For example, the onboarding server [110] may check in the Table 1 to determine the status of the IoT device [130B]. In other words, the onboarding server [110] may check in the Table 1 (having list of all the unique identifiers of the IoT devices [130]) if any of the IoT device [130] with the unique identifier "IoT 2" is registered or unregistered with the onboarding server [110]. In this case, the onboarding server [110] determines the positive matching for the unique identifier "IoT 2" i.e. the unique identifier "IoT 2" with the status "Off-board" exists in the Table 1 which indicates that the IoT device [130B] is already registered with the onboarding server [110]. Based on this determination that the IoT device [130B] is registered, the onboarding server [110] may generate the configuration setting for the IoT device [130B].

At step 216, after generating the configuration setting for the IoT device [130], the onboarding server [110] may transmit the configuration setting to the IoT device [130] via the wireless network [140] wherein the configuration setting is generated for the IoT device [130]. For instance, the onboarding server [110] may transmit the configuration setting of the IoT device [130B] to the IoT device [130B].

At step 218, the onboarding server [110] may transmit or indicate the error to the IoT device [130] when there is no or negative matching of the unique identifier corresponding to the IoT device [130] with the list of preconfigured set of identifiers. For instance, if the unique identifier "IoT 2" may not exist in the Table 1 or may not have the status as "registered", in such case, the error may be indicated to the IoT device [130B].

At step 220, when the IoT device [130] receives the configuration setting, the IoT device [130] may store the configuration setting in the memory of the IoT device [130]. For instance, IoT device [130B] may store the configuration setting in the memory.

At step 222, the IoT device [130] may transmit the indication to the onboarding server [110] for storing the configuration setting in the memory of the IoT device [130].

At step 224, once the onboarding server [110] receives indication from the IoT device [130] for storing the configuration setting, the onboarding server [110] may update/ switch the status of the IoT device [130] from "Off-board" to "On-board". For instance, the onboarding server [110] may update/switch the status of the IoT device [130B] from "Off-board" to "the On-board".

At step 226, based on the updated status of the IoT device [130], the permanent connection may be established between the IoT device [130] and the access point [120] via the wireless network [140] using the configuration setting. In other words, after storing the configuration setting, the IoT device [130] may now again transmit the broadcast/discovery probe request to the access point [120] which in turn, may transmit the configuration setting request to the onboarding server [110]. The broadcast/discovery probe request from the IoT device [130] to the access point [120] and the configuration setting request from the access point [120] to the onboarding server [110] may include the unique identifier of the IoT device [130]. Then, the onboarding server [110] may determine the status of the IoT device [130] based on the unique identifier of the IoT device [130] resulting in transmitting the configuration setting, this time, to the access point [120] as the IoT device [130] has the status as "On-board", thereby, the permanent connection may be established between the IoT device [130] and the access point [120] via the wireless network [140] using the configuration setting.

Figure 3:
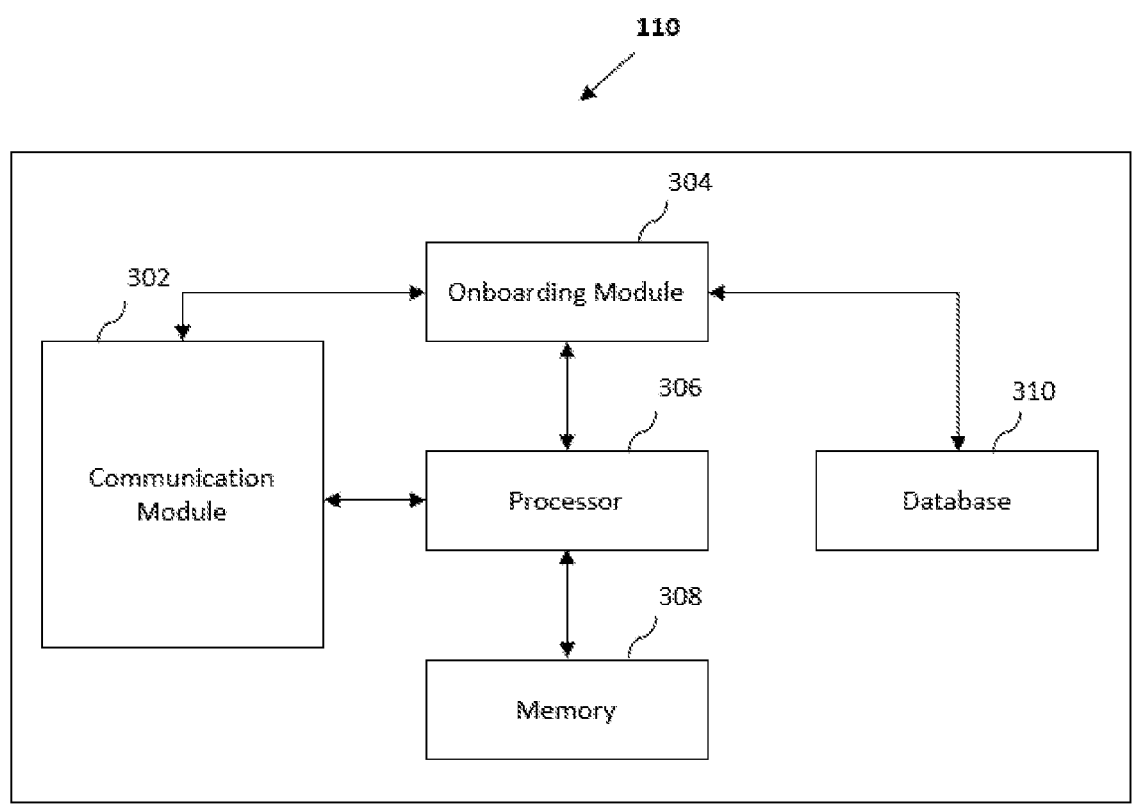
FIG. 3 illustrates an exemplary onboarding server [110], in accordance with an embodiment of the present disclosure.

As illustrated in FIG. 3, the present invention illustrates the exemplary onboarding server [110], in accordance with an embodiment of the present disclosure, the onboarding server [110] comprises, but not limited to: a communication module [302], an onboarding module [304], a processor [306], a memory [308], and a database [310].

The communication module [302] may be configured to enable the onboarding server [110] to communicate with multiple external entities including the access point [120] and the IoT device [130]. Such communication includes receiving the configuration setting request, receiving the identifier, transmitting the configuration setting, transmitting the default setting and the receiving indication/acknowledgement etc.

The onboarding module [304] may be configured to execute one or more onboarding functions such as, but not limited to, switching the status of the IoT device [130], generating the configuration setting, onboarding the IoT device [130] etc. The onboarding module [304] may further be configured to provide access to an onboarding user interface on the computing device connected with the IoT device [130] over the wireless network [140]. The onboarding module [304] also be configured to provide interact with the database [310] and the processor [306].

The processor [306] may be configured to determine the status of the IoT device [130] based on the analysis of the unique identifier corresponding of the IoT device [130] by referring to the database [310] and the data stored in the memory [308]. The processor [306] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [308], coupled to the processor [306], may allow the processor [306] to perform operations such as read, write, modify, delete and/or modify data in the memory [308] and/or the database [310]. The memory [308] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

The database [310] may be configured to store and manage multiple data sets including data related to the onboarding of the IoT device [130] and the access point [120]. The data stored in the database [310] may accessed by the onboarding module [304]. The exemplary Table 1 may be stored at the database [310]. The functions/operations defined herein for the memory [308] and the database [310] are interchangeable.

Figure 4:
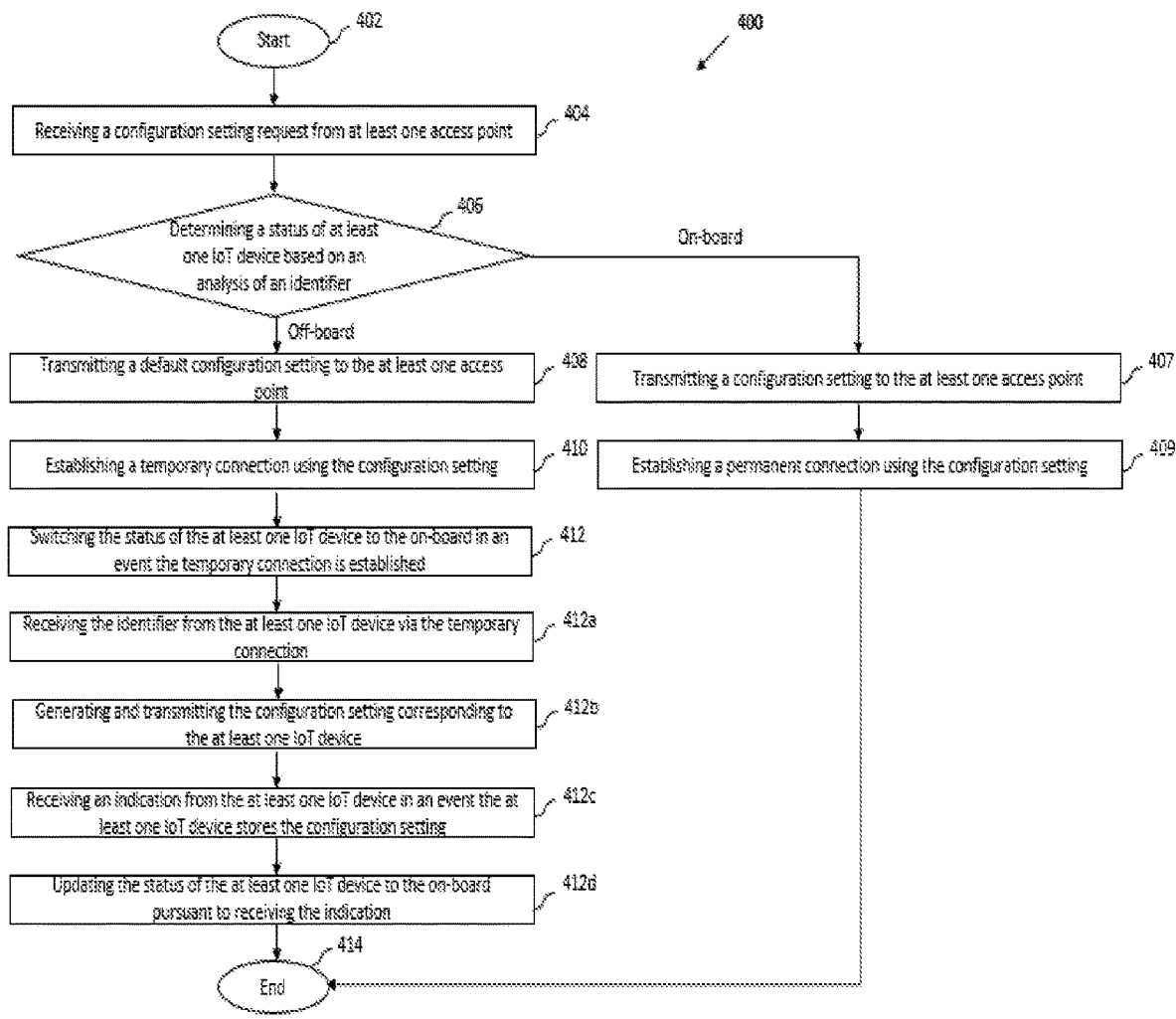
FIG. 4 illustrates an exemplary method flow diagram [400] performed by the onboarding server [100], for automatically connecting the IoT device to the access point via the wireless network, in accordance with an embodiment of the present invention.

As illustrated in FIG. 4, the present invention illustrates an exemplary method flow diagram [400] performed by the onboarding server [110], for automatically connecting the IoT device [130] to the access point [120] via the wireless network [140], in accordance with an embodiment of the present invention. The method flow initiates at step 402.

At step 404, the onboarding server [110] may receive the configuration setting request from the access point [120] wherein the configuration setting request is transmitted by the access point [120] after receiving the broadcast/discovery probe request from the IoT device [130] when the IoT device [130] is being turned on. The configuration setting request includes the unique identifier of the IoT device [130].

At step 406, the onboarding server [110] may determine the status of the IoT device [130] based on the unique identifier of the IoT device [130].

At step 407, the onboarding server [110] may transmit the configuration setting of the IoT device [130] to the access point [120] in an event the IoT device [130] has the status as "On-board".

At step 408, the onboarding server [110] may transmit the default setting of the IoT device [130] to the access point [120] in an event the IoT device [130] has the status as "Off-board".

At step 409, once the access point [120] receives the configuration setting from the onboarding server [110], the onboarding server [110] may establish the permanent connection between the IoT device [130] and the access point [120] via the wireless network [140].

At step 410, once the access point [120] receives the default setting from the onboarding server [100], the onboarding server [110] may establish the temporary connection between the IoT device [130] and the access point [120] via the wireless network [140].

At step 412, the onboarding server [110] may switch the status of the at least one IoT device [130] to the "On-board" in the event the temporary connection is established between the IoT device [130] and the access point [120] via the wireless network [140]. The switching of the status of the IoT device [130] to the "On-board" includes steps from 412a to 412d.

At step 412a, in a scenario where the temporary connection is established between the IoT device [130] and the access point [120] via the wireless network [140] using the default setting, the IoT device [130] may now communicate via the wireless network [140] with the onboarding server [110]. In such scenario, the onboarding server [110] receives the unique identifier from the IoT device [130] via the wireless network [140] wherein the unique identifier corresponds to the IoT device [130].

At step 412b, on receiving the unique identifier from the IoT device [130], the onboarding server [110] may determine if the IoT device [130] is registered or unregistered with the onboarding server [110]. In an event, there is a positive matching of the unique identifier corresponding to the IoT device [130] with the list of preconfigured set of identifiers i.e. the IoT device [130] is registered with the onboarding server [110], the onboarding server [110] may generate the configuration setting for the IoT device [130]. Also, the onboarding server [110] may transmit or indicate the error to the IoT device [130] when there is no or negative matching of the unique identifier corresponding to the IoT device [130] with the list of preconfigured set of identifiers. Further, after generating the configuration setting for the IoT device [130], the onboarding server [110] may transmit the configuration setting to the IoT device [130] via the wireless network [140] wherein the configuration setting is generated for the IoT device [130].

At step 412c, when the IoT device [130] receives the configuration setting, the IoT device [130] may store the configuration setting in the memory of the IoT device [130]. Then, the IoT device [130] may transmit the indication to the onboarding server [110] for storing the configuration setting in the memory of the IoT device [130] thereby, the onboarding server [110] may receive the indication from the IoT device [130] for storing the configuration setting in the memory.

At step 412d, the onboarding server [110] may update/switch the status of the IoT device [130] from "Off-board" to "On-board". Then, the method [400] may end at step 420.

Figure 5:
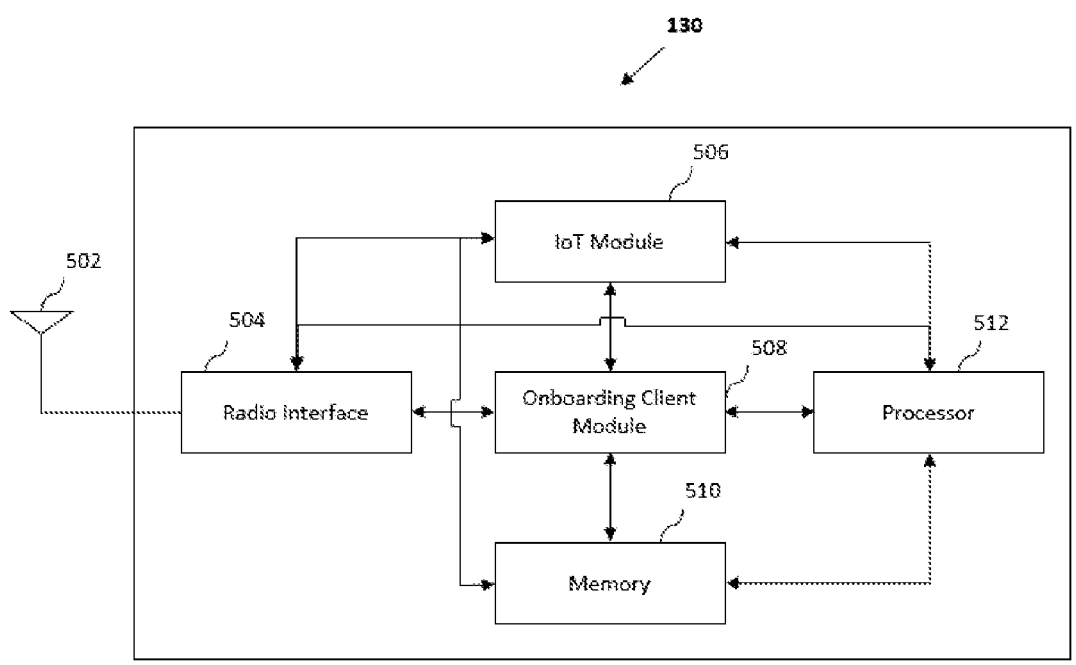
FIG. 5 illustrates an exemplary IoT device [130], in accordance with an embodiment of the present disclosure.

As illustrated in FIG. 5, the present invention illustrates the exemplary IoT device [130], in accordance with an embodiment of the present disclosure, the IoT device [130] comprises, but not limited to: an antenna [502], a radio interface [504], an IoT module [506], an onboarding client module [508], a memory [510], and a processor [512].

The antenna [502] of the IoT device [130] may be configured to receive and transmit wireless radio signals from/to the air over the wireless network [140]. Further, the antenna [502] may be configured to receive and transmit wireless radio signals from/to the access point [120] over the wireless network [140].

The radio interface [504] may be configured to enable the IoT device [130] to communicate with the access point [120] and the onboarding server [110]. The communication includes, but not limited to, transmitting the broadcasting probe request to the access point [120], establishing the permanent/temporary connection, transmitting the unique identifier, receiving the configuration setting etc.

The IoT module [506] may be configured to implement primary/core functionality of the IoT device [130] in combination with multiple hardware and software components.

The onboarding client module [508] may be configured to enable the IoT device [130] to communicate with the onboarding server [110] via the radio interface [504]. Further, the onboarding client module [508] may be configured to perform onboarding function for the IoT device [130].

The memory [510], of the IoT device [130] coupled to the processor [512], may be configured to store the default setting and/or the configuration setting. The memory [510], coupled to the processor [512], may allow the processor [512] to perform operations such as read, write, modify, delete and/or modify data in the memory [510]. The memory [510] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

The processor [512] may be configured to execute functions performed by each module/component of the IoT device [130]. The processor [512] as used herein may include, but is not limited to, a processor or set of processors such as a microprocessor, a multi-core microprocessor, a digital signal processor, a collection of electronic circuits, or a combination thereof and may be configured to perform operations/functions as described herein.

Figure 6:
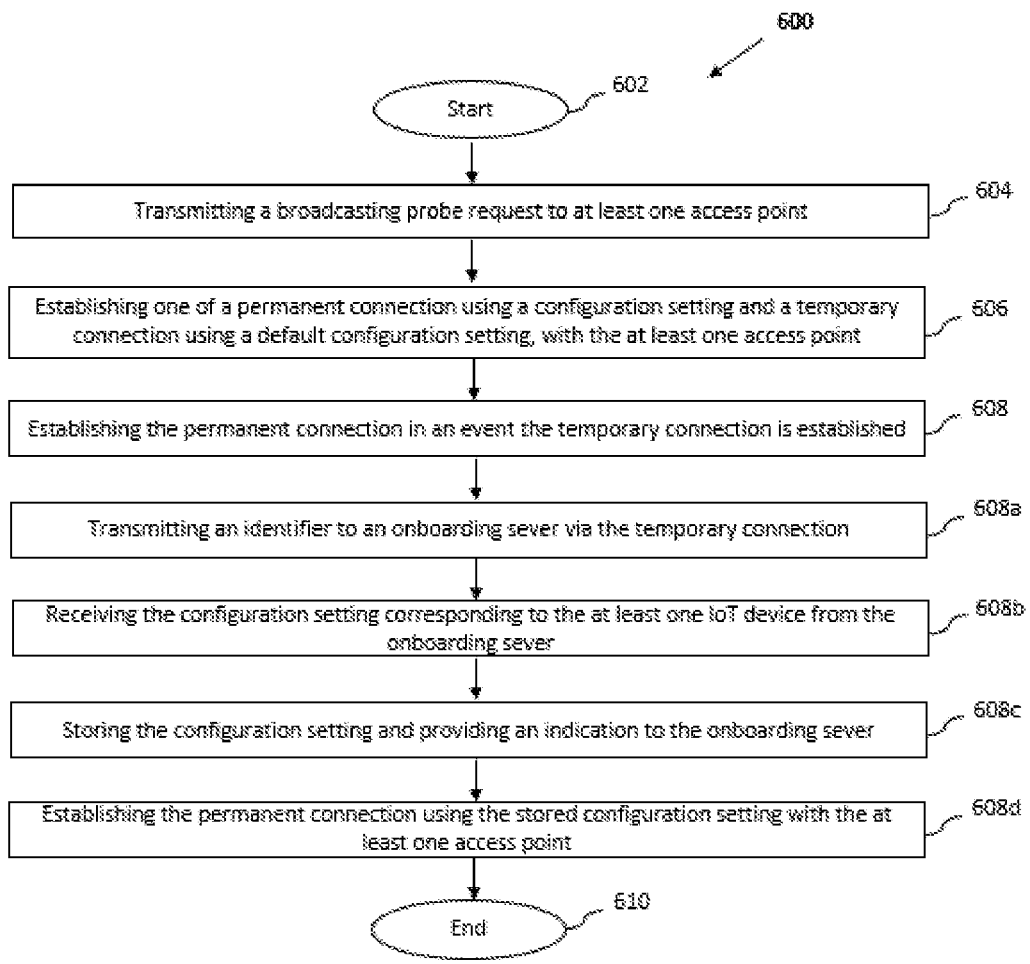
FIG. 6 illustrates an exemplary method flow diagram [600] performed by the IoT device [130], for automatically connecting the IoT device to the access point via the wireless network, in accordance with an embodiment of the present invention.

As illustrated in FIG. 6, the present invention an exemplary method flow diagram [600] performed by the IoT device [130], for automatically connecting the IoT device [130] to the access point [120] via the wireless network [140], in accordance with an embodiment of the present invention. The method flow initiates at step 602.

At step 604, when the IoT device [130] is turned on, the IoT device [130] may transmit the broadcast/discovery probe request to the access point [120] in the form of transmitting one or more packets in the air which may be captured by the access point [120]. The access point [120], in turn, may transmit the configuration setting request to the onboarding server [110]. The broadcast/discovery probe request from the IoT device [130] to the access point [120] and the configuration setting request from the access point [120] to the onboarding server [110] may include the unique identifier of the IoT device [130].

At step 606, based on the status of the IoT device [130], the IoT device [130] may establish the permanent connection using the configuration setting with the at least one access point [120] via the wireless network [140] in the event the status of the IoT device [130] is "On-board". Further, the IoT device [130] may establish the temporary connection using the default setting with the at least one access point [120] via the wireless network [140] in the event the status of the IoT device [130] is "Off-board".

At step 608, the IoT device [130] may attempt to establish the permanent connection with the access point [120] via the wireless network [140] in the event the temporary connection is established. The establishment of the permanent connection from the temporary connection includes steps from 608a to 608d.

At step 608a, in the scenario where the temporary connection is established between the IoT device [130] and the access point [120] via the wireless network [140] using the default setting, the IoT device [130] may now communicate via the wireless network [140] with the onboarding server [110]. In such scenario, the IoT device [130] may push/transmit the unique identifier to the onboarding server [110] via the wireless network [140] wherein the unique identifier corresponds to the IoT device [130].

At step 608b, on receiving the unique identifier from the IoT device [130], the onboarding server [110] may determine if the IoT device [130] is registered or unregistered with the onboarding server [110]. In an event, there is a positive matching of the unique identifier corresponding to the IoT device [130] with the list of preconfigured set of identifiers [e.g. IoT 1, IoT 2, IoT 3, IoT 4, IoT 5] i.e. the IoT device [130] is registered with the onboarding server [110], the onboarding server [110] may generate the configuration setting for the IoT device [130]; otherwise the onboarding server [110] may transmit or indicate the error to the IoT device [130] when there is no or negative matching of the unique identifier corresponding to the IoT device [130] with the list of preconfigured set of identifiers. After generating the configuration setting for the IoT device [130], the onboarding server [110] may transmit the configuration setting to the IoT device [130] via the wireless network [140] wherein the configuration setting is generated for the IoT device [130]. Thereby, the IoT device [130] receives the configuration setting from the onboarding server [110].

At step 608c, When the IoT device [130] receives the configuration setting from the onboarding server [110], the IoT device [130] may store the configuration setting in the memory of the IoT device [130] and may further transmit/provide the indication to the onboarding server [110] for storing the configuration setting in the memory of the IoT device [130].

At step 608d, after transmitting/providing the indication to the onboarding server [110], the IoT device [130] may establish the permanent connection using the configuration setting, with the access point [120] via the wireless network [140]. Then, the method [600] may end at step 610.

Figure 7:
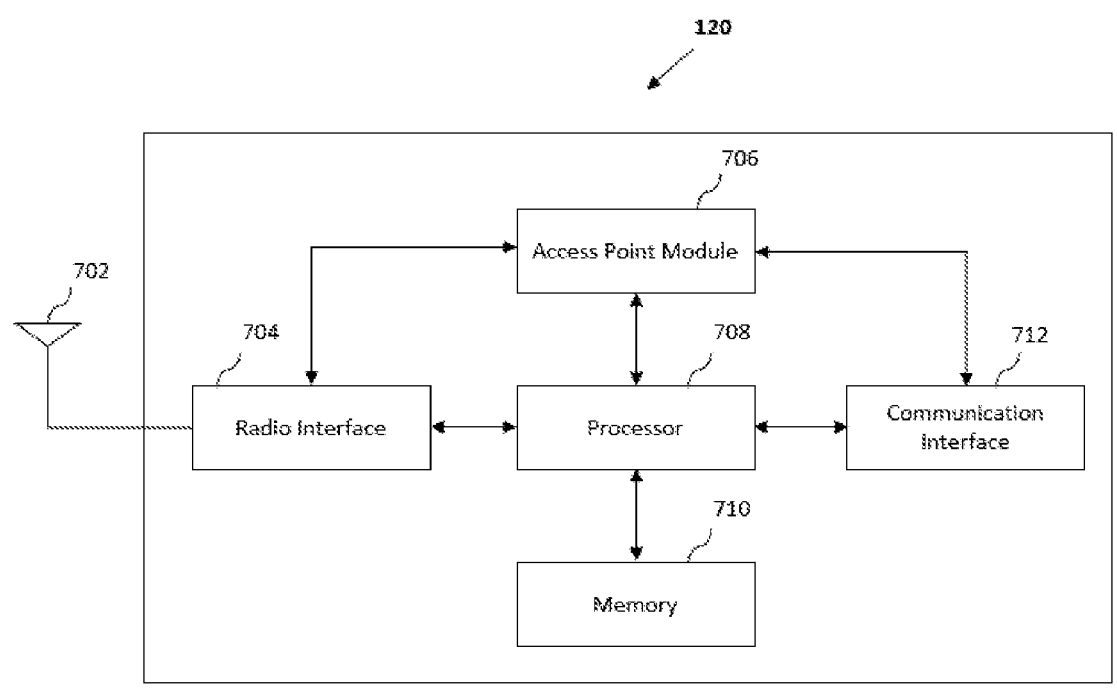
FIG. 7 illustrates an exemplary access point [120], in accordance with an embodiment of the present disclosure.

As illustrated in FIG. 7, the present invention illustrates the exemplary access point [120], in accordance with an embodiment of the present disclosure, the access point [120] comprises, but not limited to: an antenna [702], a radio interface [704], an access point module [706], a processor [708], a memory [710] and a communication interface [712].

The antenna [702] of the access point [120] may be configured to receive and transmit wireless radio signals from/to the air over the wireless network [140]. Further, the antenna [702] may be configured to receive and transmit wireless radio signals from/to the IoT device [130] over the wireless network [140].

The radio interface [704] may be configured to enable the access point [120] to communicate with the IoT device [130]. The communication includes, but not limited to, receiving the broadcast/discovery probe request from the IoT device [130].

The access point module [706] may be configured to manage and provision the access point [120] that allow the IoT device [130] and the onboarding server [110] to establish one of the permanent connection using the configuration setting and the temporary connection using the default setting via the wireless network [140].

The processor [708] may be configured to execute functions performed by each module/component of the access point [120]. The processor [708] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [710], coupled to the processor [708], may allow the processor [708] to perform operations such as read, write, modify, delete and/or modify data in the memory [710]. The memory [710] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

The communication interface [712] may be configured to communicate with the onboarding server [110] to exchange information with one or more external entities. Such communication includes, but not limited to, transmitting configuration setting request, and receiving the configuration setting/default setting etc., with the on-boarding server [110].

Figure 8:
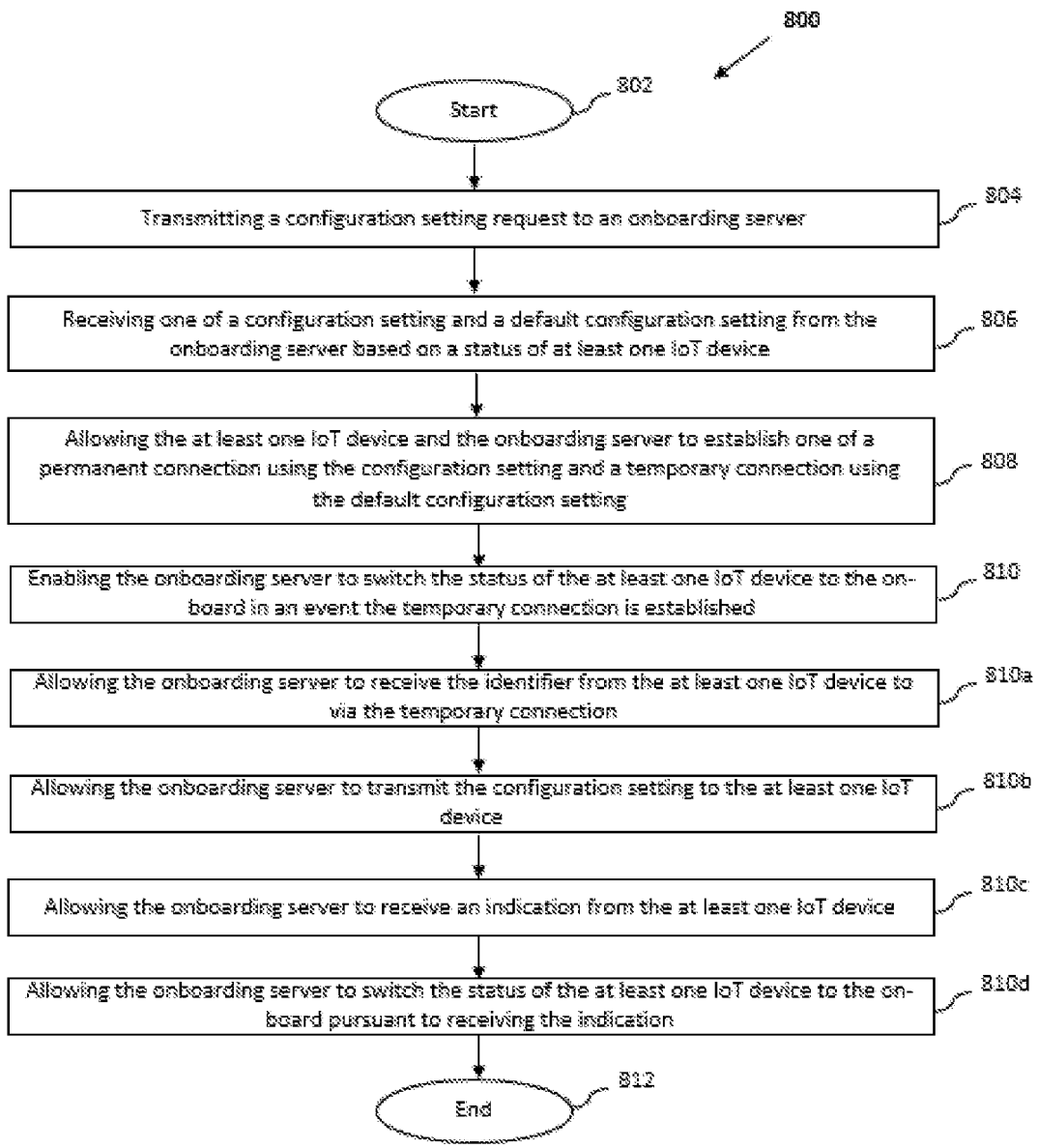
FIG. 8 illustrates an exemplary method flow diagram [800] performed by the access point [120], for automatically connecting the IoT device to the access point via the wireless network, in accordance with an embodiment of the present invention.

As illustrated in FIG. 8, the present invention illustrates the exemplary method flow diagram [800] performed by the access point [120] for automatically connecting the IoT device [130] to the access point [120] via the wireless network [140], in accordance with an embodiment of the present invention. The method flow initiates at step 802.

At step 804, the access point [120] may transmit the configuration setting request to the onboarding server [110]. The configuration setting request may be transmitted to the onboarding server [110] after the IoT device [130] transmits the broadcast/discovery probe request to the access point [120] in the form of transmitting one or more packets in the air which may be captured by the access point [120]. The broadcast/discovery probe request from the IoT device [130] to the access point [120] and the configuration setting request from the access point [120] to the onboarding server [110] may include the unique identifier of the IoT device [130].

At step 806, on receiving the configuration setting request from the access point [120], the onboarding server [110] may then determine the status of the IoT device [130]. Based on the unique identifier of the IoT device [130], the access point [120] may receive the configuration setting from the onboarding server [110] if the IoT device [130] has the status as "On-board". Similarly, the access point [120] may receive the default setting from the onboarding server [110] if the IoT device [130] has the status as "Off-board".

At step 808, the access point [120] may allow the IoT device [130] to establish the temporary connection with the access point [120] via the wireless network [140] using the default setting; otherwise, the access point [120] may allow the IoT device [130] to establish the permanent connection between the access point [120] and the IoT device [130] via the wireless network [140] using the configuration setting.

At step 810, the access point [120] may enable the onboarding server [110] to switch the status of the at least one IoT device [130] to the "On-board" in the event the temporary connection is established between the IoT device [130] and the access point [120] via the wireless network [140]. The switching of the status of the at least one IoT device [130] to the "On-board" includes steps from 810a to 810d.

At step 810a, the access point [120] may allow the IoT device [130] to communicate with the onboarding server [110] via the wireless network [140] using the temporary connection. The access point [120] may allow the onboarding server [110] to receive the unique identifier from the IoT device [130] via the wireless network [140] wherein the unique identifier corresponds to the IoT device [130].

At step 810b, the access point [120] may allow, via the network [140], the onboarding server [110] to transmit the configuration setting to the IoT device [130] in the event the onboarding server [110] generates the configuration setting based on the positive matching of the unique identifier corresponding to the IoT device [130] with the list of preconfigured set of identifiers i.e. the IoT device [130] is registered with the onboarding server [110]. Further, the access point [120] may allow the onboarding server [110] to transmit or indicate the error to the IoT device [130] when there is no or negative matching of the unique identifier corresponding to the IoT device [130] with the list of preconfigured set of identifiers.

At step 810c, the access point [120] may allow, via the wireless network [140], the onboarding server [110] to receive the indication from the IoT device [130] for storing the configuration setting in the memory.

At step 810d, the access point [120] may allow the onboarding server [110] to update/switch the status of the IoT device [130] from "Off-board" to "On-board" thereby allowing the IoT device [130] to connect with the access point [120] using the configuration setting via the wireless network [140]. Then, the method [800] may end at step 812.

Further, the present invention encompasses a system and a method for preconfiguring access point [120] includes at least one of configuring the at least one access point [120] to communicate with the onboarding server [110] and synchronizing at least one network identifier of the access point [120] with the onboarding server [110]. The network identifier, as used herein, may refer to an identifier that identifies the wireless network [140] and users who request access to the wireless network [140].

The interface, module, memory, database, processor and component depicted in the figures and described herein may be present in the form of a hardware, a software and a combination thereof. Connection shown between these components/module/interface in the system [100] are exemplary and any components/module/interface in the system [100] may interact with each other through various logical links and/or physical links. Further, the components/module/interface may be connected in other possible ways.

Though a limited number of the onboarding server [110], the access point [120], the IoT device [130], the wireless network [140], interface, module, memory, database, processor and component, have been shown in the figures; however, it will be appreciated by those skilled in the art that the overall system [100] of the present invention encompasses any number and varied types of the entities/elements such as the onboarding server [110], the access point [120], the IoT device [130], the wireless network [140], interface, module, memory, database, processor and component.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for automatically connecting at least one IoT device [130] to at least one access point [120] via a wireless network [140], the method being performed by an onboarding server [110], the method comprising:
   receiving a configuration setting request from at least one access point [120], wherein
      the at least one access point [120] transmits the configuration setting request pursuant to receiving a broadcasting probe request from the at least one IoT device [130], and
      the configuration setting request includes an identifier corresponding to the at least one IoT device [130];
   determining a status of the at least one IoT device [130] based on an analysis of the identifier, wherein the status of the at least one IoT device [130] includes one of an on-board and an off-board;
   transmitting one of a configuration setting and a default setting to the at least one access point [120] based on the status of the at least one IoT device [130], wherein
      the configuration setting is transmitted to the at least one access point [120] in an event the status of the at least one IoT device [130] is the on-board, and
      the default setting is transmitted to the at least one access point [120] in an event the status of the at least one IoT device [130] is the off-board;
   establishing one of a permanent connection using the configuration setting and a temporary connection using the default setting, between the at least one access point [120] and the at least one IoT device [130] via the wireless network [140]; and
   switching the status of the at least one IoT device [130] to the on-board in an event the temporary connection is established, wherein the switching comprising steps of:

receiving the identifier from the at least one IoT device [130] via the temporary connection, generating and transmitting the configuration setting corresponding to the at least one IoT device [130] based on a positive matching of the identifier with a preconfigured set of identifiers, receiving an indication from the at least one IoT device [130] in an event the at least one IoT device [130] stores the configuration setting, and updating the status of the at least one IoT device [130] to the on-board pursuant to receiving the indication.

2. The method as claimed in claim 1, further comprising preconfiguring the preconfigured set of identifiers including at least one identifier corresponding to the at least one IoT device [130] using one of an application and a web-portal.

3. The method as claimed in claim 1, further comprising preconfiguring the default setting corresponding to the at least one IoT device [130] using one of the application and the web-portal.

4. The method as claimed in claim 1, further comprising transmitting an error indication to the at least one IoT device [130] based on a negative matching of the identifier with the preconfigured set of identifiers.

5. The method as claimed in claim 1, wherein the default setting comprises one of a service set identifier, a passphrase and a combination thereof.

6. The method as claimed in claim 1, wherein the default setting is pre-stored at the at least one IoT device [130].

7. The method as claimed in claim 1, wherein the configuration setting comprises one of a service set identifier, a passphrase and a combination thereof.

8. The method as claimed in claim 1, wherein the identifier corresponding to the at least one IoT device [130] comprises one a media access control address, a vendor identifier and a unique identifier.

9. A method for automatically connecting at least one IoT device [130] over at least one wireless network [140], the method being performed by the at least one IoT device [130], the method comprising:

transmitting a broadcasting probe request to at least one access point [120], wherein
 the broadcasting probe request includes an identifier corresponding to the at least one IoT device [130],
 the identifier is transmitted to an onboarding server [110] from the at least one access point [120] for determining a status of the at least one IoT device [130], and
 the status includes one of an on-board and an off-board;

establishing one of a permanent connection using a configuration setting and a temporary connection using a default setting, to the at least one access point [120] via the wireless network [140], wherein
 the permanent connection using the configuration setting is established in an event the status of the at least one IoT device [130] is the on-board, and
 the temporary connection using a default setting is established in an event the status of the at least one IoT device [130] is the off-board; and establishing the permanent connection in an event the temporary connection is established, wherein the establishing comprising steps of:
 transmitting the identifier to the onboarding server [110] via the temporary connection,
 receiving the configuration setting corresponding to the at least one IoT device [130] from the onboarding server [110],
 storing the configuration setting and providing an indication to the onboarding server [110], and
 establishing the permanent connection using the stored configuration setting with the at least one access point [120] via the wireless network [140].

10. The method as claimed in claim 9, further comprising pre-storing the default setting at the at least one IoT device [130].

11. The method as claimed in claim 9, wherein the default setting comprises one of a service set identifier, a passphrase and a combination thereof.

12. The method as claimed in claim 9, wherein the configuration setting comprises one of a service set identifier, a passphrase and a combination thereof.

13. The method as claimed in claim 9, wherein the identifier corresponding to the at least one IoT device [130] comprises one a media access control address and a unique identifier.

14. A method for automatically connecting at least one IoT device [130] to at least one access point [120] via a wireless network [140], the method being performed by at least one access point [120], the method comprising:

transmitting a configuration setting request to an onboarding server [110], wherein
 the at least one access point [120] transmits the configuration setting request pursuant to receiving a broadcasting probe request from the at least one IoT device [130], and
 the configuration setting request includes an identifier corresponding to the at least one IoT device [130];

receiving one of a configuration setting and a default setting from the onboarding server [110] based on a status of the at least one IoT device [130], wherein
 the configuration setting is received from the onboarding server [110] in an event the status of the at least one IoT device [130] is an on-board, and
 the default setting is received from the onboarding server [110] in an event the status of the at least one IoT device [130] is an off-board;

allowing the at least one IoT device [130] and the onboarding server [110] to establish one of a permanent connection using the configuration setting and a temporary connection using the default setting via the wireless network [140]; and enabling the onboarding server [110] to switch the status of the at least one IoT device [130] to the on-board in an event the temporary connection is established, wherein the enabling the onboarding server [110] to switch comprising steps of:
 allowing the onboarding server [110] to receive the identifier from the at least one IoT device [130] to via the temporary connection,
 allowing the onboarding server [110] to transmit the configuration setting to the at least one IoT device [130] based on a positive matching of the identifier with a preconfigured set of identifiers,
 allowing the onboarding server [110] to receive an indication from the at least one IoT device [130] in an event the at least one IoT device [130] stores the configuration setting, and
 allowing the onboarding server [110] to switch the status of the at least one IoT device [130] to the on-board pursuant to receiving the indication.

15. The method as claimed in claim 1, further comprising allowing the onboarding server [110] to transmit an error indication to the at least one IoT device [130] based on a negative matching of the identifier with the preconfigured set of identifiers.

16. The method as claimed in claim 1, wherein the default setting comprises one of a service set identifier, a passphrase and a combination thereof.

17. The method as claimed in claim 1, wherein the default setting is pre-stored at the at least one IoT device [130].

18. The method as claimed in claim 1, wherein the configuration setting comprises one of a service set identifier, a passphrase and a combination thereof.

19. The method as claimed in claim 1, wherein the identifier corresponding to the at least one IoT device [130] comprises one a media access control address and a unique identifier.

20. The method as claimed in claim 1, further comprising pre-configuring the at least one access point [120] includes at least one of:
  configuring the at least one access point [120] to communicate with the onboarding server [110]; and
  synchronizing at least one network identifier of the at least one access point [120] with the onboarding server [110].

21. An onboarding server [110] for automatically connecting at least one IoT device [130] over at least one wireless network [140], the onboarding server [110] comprising:
  a communication module configured to:
    receive a configuration setting request from at least one access point [120], wherein
      the at least one access point [120] transmits the configuration setting request pursuant to receiving a broadcasting probe request from the at least one IoT device [130], and
      the configuration setting request includes an identifier corresponding to the at least one IoT device [130];
  a processor configured to:
    determine a status of the at least one IoT device [130] based on an analysis of the identifier, wherein the status of the at least one IoT device [130] includes one of an on-board and an off-board;
  wherein the communication module configured to:
    transmit one of a configuration setting and a default setting to the at least one access point [120] based on the status of the at least one IoT device [130], wherein
      the configuration setting is transmitted to the at least one access point [120] in an event the status of the at least one IoT device [130] is the on-board, and
      the default setting is transmitted to the at least one access point [120] in an event the status of the at least one IoT device [130] is the off-board, and
    establish one of a permanent connection using the configuration setting and a temporary connection using the default setting, between the at least one access point [120] and the at least one IoT device [130] via the wireless network [140]; and
  an onboarding module configured to:
    switch the status of the at least one IoT device [130] to the on-board in an event the temporary connection is established, wherein the switching comprising:
      receiving the identifier from the at least one IoT device [130] via the temporary connection using the communication module,
      generating and transmitting the configuration setting corresponding to the at least one IoT device [130] based on a positive matching of the identifier with a preconfigured set of identifiers,
      receiving an indication from the at least one IoT device [130] in an event the at least one IoT device [130] stores the configuration setting using the communication module, and
      updating the status of the at least one IoT device [130] to the on-board pursuant to receiving the indication.

22. The onboarding server [110] as claimed in claim 21, wherein the receiving of the identifier, the transmitting of the configuration setting and the receiving of the indication is performed using the communication module.

23. An IoT device [130] for automatically connecting the at least one IoT device [130] over at least one wireless network [140], the IoT device [130] comprising:
  a radio interface configured to:
    transmit a broadcasting probe request to at least one access point [120], wherein
      the broadcasting probe request includes an identifier corresponding to the at least one IoT device [130],
      the identifier is transmitted to an onboarding server [110] from the at least one access point [120] for determining a status of the at least one IoT device [130], and
      the status includes one of an on-board and an off-board; and
    establish one of a permanent connection using a configuration setting and a temporary connection using a default setting, to the at least one access point [120] via the wireless network [140], wherein
      the permanent connection using the configuration setting is established in an event the status of the at least one IoT device [130] is the on-board, and
      the temporary connection using a default setting is established in an event the status of the at least one IoT device [130] is the off-board; and
    establish the permanent connection in an event the temporary connection is established, wherein the establishing comprising:
      transmitting the identifier to the onboarding server [110] via the temporary connection,
      receiving the configuration setting corresponding to the at least one IoT device [130] from the onboarding server [110],
      storing the configuration setting and providing an indication to the onboarding server [110], and
      establishing the permanent connection using the stored configuration setting with the at least one access point [120] via the wireless network [140].

24. The onboarding server [110] as claimed in claim 23, wherein the configuration setting is stored in a memory of the at least one IoT device [130].

25. An access point [120] for automatically connecting the at least one IoT device [130] over at least one wireless network [140], the access point [120] comprising:
  a communication interface configured to:
    transmit a configuration setting request to an onboarding server [110], wherein
      the at least one access point [120] transmits the configuration setting request pursuant to receiving a broadcasting probe request from the at least one IoT device [130], and
      the configuration setting request includes an identifier corresponding to the at least one IoT device [130];

receive one of a configuration setting and a default setting from the onboarding server [110] based on a status of the at least one IoT device [130], wherein the configuration setting is received from the onboarding server [110] in an event the status of the at least one IoT device [130] is an on-board, and the default setting is received from the onboarding server [110] in an event the status of the at least one IoT device [130] is an off-board;

an access point [120] module configured to:

allow the at least one IoT device [130] and the onboarding server [110] to establish one of a permanent connection using the configuration setting and a temporary connection using the default setting via the wireless network [140]; and enable the onboarding server [110] to switch the status of the at least one IoT device [130] to the on-board in an event the temporary connection is established, wherein the enabling the onboarding server [110] to switch comprising:

allowing the onboarding server [110] to receive the identifier from the at least one IoT device [130] to via the temporary connection, allowing the onboarding server [110] to transmit the configuration setting to the at least one IoT device [130] based on a positive matching of the identifier with a preconfigured set of identifiers, allowing the onboarding server [110] to receive an indication from the at least one IoT device [130] in an event the at least one IoT device [130] stores the configuration setting, and allowing the onboarding server [110] to switch the status of the at least one IoT device [130] to the on-board pursuant to receiving the indication.

26. The access point [120] as claimed in claim 25, wherein the broadcasting probe request is received from the at least one IoT device [130] at the access point [120] using a radio interface.

* * * * *